(12) United States Patent
Swaminathan et al.

(10) Patent No.: US 8,731,238 B2
(45) Date of Patent: May 20, 2014

(54) MULTIPLE VIEW FACE TRACKING

(75) Inventors: Gurumurthy Swaminathan, Bangalore (IN); Saad J. Bedros, West St. Paul, MN (US); Ullam Subbaraya Yadhunandan, Andhra Pradesh (IN); Jana Trojanova, Velke Chvojno (CS)

(73) Assignee: Honeywell International Inc., Morristown, NJ (US)

( * ) Notice: Subject to any disclaimer, the term of this patent is extended or adjusted under 35 U.S.C. 154(b) by 1342 days.

(21) Appl. No.: 12/482,350

(22) Filed: Jun. 10, 2009

(65) Prior Publication Data
US 2010/0316298 A1    Dec. 16, 2010

(51) Int. Cl.
*G06K 9/00*    (2006.01)
(52) U.S. Cl.
USPC ............ 382/103; 382/116; 382/199; 348/169
(58) Field of Classification Search
USPC .......................... 382/103, 118, 199; 348/169
See application file for complete search history.

(56) References Cited

U.S. PATENT DOCUMENTS

| | | | |
|---|---|---|---|
| 6,810,144 B2 | 10/2004 | McGee et al. | |
| 7,336,830 B2 * | 2/2008 | Porter et al. | 382/218 |
| 7,627,178 B2 | 12/2009 | Suzuki et al. | |
| 8,064,639 B2 | 11/2011 | Swaminathan et al. | |
| 2004/0081074 A1 | 4/2004 | Piechocki | |
| 2006/0044446 A1 | 3/2006 | Porter et al. | |
| 2006/0224318 A1 | 10/2006 | Wilson et al. | |
| 2009/0022364 A1 * | 1/2009 | Swaminathan et al. | 382/103 |

OTHER PUBLICATIONS

Fortmann, T., et al. "Sonar tracking of multiple Targets using Joint Probabilistic Data Association" IEEE Journal of Oceanic Engineering vol, OE-8, No. 3, Jul. 1983. pp. 173-184.*
"U.S. Appl. No. 11/780,238, Final Office Action mailed Apr. 19, 2011", 9 pgs.
"United Kingdom Application Serial No. 1009566,9; Office Action mailed Apr. 11, 2011", 2 Pgs.
"U.S. Appl. No. 11/780,238, Non Final Office Action mailed Dec. 6, 2010", 18 pgs.
"U.S. Appl. No. 11/780,238, Response filed Jan. 27, 2011 to Non Final Office Action mailed Dec. 6, 2010", 10 pgs.
"British Application Serial No. 1009566.9, Office Action mailed Sep. 20, 2010", 5 pgs.
"British Application Serial No. 1009566.9, Response filed Feb. 16, 2011 to Office Action mailed Sep. 20, 2010", 6 pgs.
"Joint Probabilistic Data Association Filter", Wikipedia®, the free encyclopedia, [online]. [retrieved Sep. 24, 2010]. Retrieved from the Internet: <http://en.wikipedia.org/wiki/Joint_Probabilistic-Data-Association-Filter>, (updated Feb. 27, 2009), 1 pg.
Rasmussen, C., et al., "Probabilistic Data Association Methods for Tracking Complex Visual Objects", *IEEE Trans on Pattern Analysis and Machine Intelligence*, 23(6) (Jun. 2001), 560-576.

(Continued)

*Primary Examiner* — Matthew Bella
*Assistant Examiner* — Julian Brooks
(74) *Attorney, Agent, or Firm* — Schwegman, Lundberg & Woessner, P.A.

(57) ABSTRACT

A system and method track a face moving through multiple frames of a video sequence. A predicted position of a face in a video frame is obtained. A search is performed to determine appearance model similarity values of a detected face. Motion and appearance probabilities of the detected face are obtained, and the detected face in the video frame is associated with a track as a function of a joint probabilistic data association filter.

22 Claims, 11 Drawing Sheets

(56) References Cited

OTHER PUBLICATIONS

"U.S. Appl. No. 11/780,238, Notice of Allowance mailed Jul. 12, 2011", 7 pgs.

"European Application Serial No. 08160253.4, European Search Report mailed Apr. 11, 2012", 4 pgs.

Arulampalam, M. S., et al., "A tutorial on particle filters for online nonlinear/non-Gaussian Bayesian tracking", *IEEE Transactions on Signal Processing*, 50(2), (Feb. 1, 2002), 174-188.

Brasnett, P., et al., "Sequential Monte Carlo tracking by fusing multiple cues in video sequences", *Image and Vision Computing*, 25(8), (May 19, 2007), 1217-1227.

Jin, Y., et al., "Data fusion for robust head tracking by particles", *2nd Joint IEEE International Workshop on Visual Surveillance and Performance Evaluation of Tracking and Surveillance*, 2005, (Oct. 15, 2005), 33-40.

Raducanu, B., et al., "A Robust Particle Filter-Based Face Tracker Using Combination of Color and Geometric Information", *Image Analysis and Recognition, Lecture Notes in Computer Science*, (2006), 922-933.

Rasmussen, C., et al:, "Joint probabilistic techniques for tracking objects using multiple visual cues", *1998 IEEE/RSJ International Conference on Intelligent Robots and Systems, 1998. Proceedings*, (Oct. 13, 1998), 191-196.

Stamou, G., et al., "2D and 3D Motion Tracking in Digital Video", *Handbook of Diaital Image and Video Processing*, Editor, Al Bovik; Amsterdam ; Boston, MA : Elsevier Academic Press, (Jun. 21, 2005), 491-517.

"U.S. Appl. No. 11/780,238 , Response filed Jun. 15, 2011 to Final Office Action mailed Apr. 19, 2011", 6 pgs.

"British Application Serial No. 1009566.9, Response filed Jun. 1, 2011 to Examination Report mailed Apr. 11, 2011", 5 pgs.

\* cited by examiner

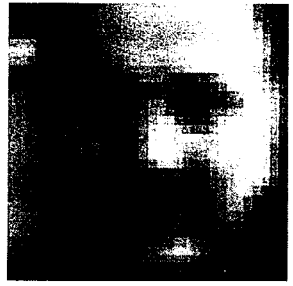  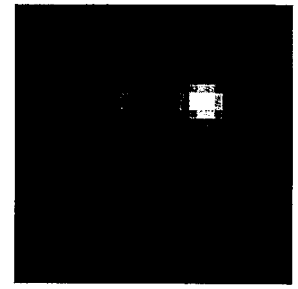

305 ~ For each track
    310 ~ Obtain the predicted position of the face
    315 ~ If (predicted position is out of frame)
              delete the track
              continue
          end
    320 ~ Search for best match around the predicted position
    end
325 ~ Associate the detections with the tracks based on the overlap between
          the position of the best match and the position of the detection
330 ~ If (more then one track is associated with a detection)
          remove the associations except the one that has the best
          overlap
      end
335 ~ for each (detection not associated with any track)
          start a new track on the detection
      end
340 ~ If (track is not associated with detections AND
              track has lived for less than 2 frames)
          delete the track
```

FIG. 3

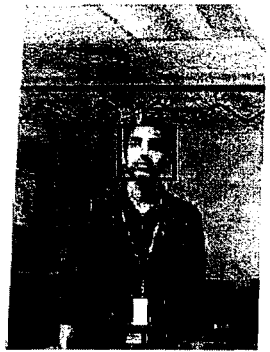
FRAME 5
FRAME 8
FRAME 14
FRAME 15
FRAME 17
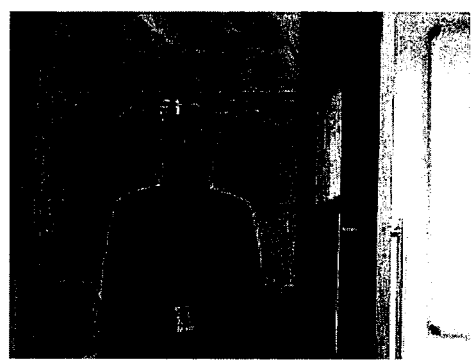
FRAME 18
*FIG. 7*

FRAME 13
FRAME 20
FRAME 27
FRAME 33
FRAME 46
FRAME 66
FRAME 89
FRAME 100
*FIG. 14*

MULTIPLE VIEW FACE TRACKING

BACKGROUND

Tracking faces in a video sequence is an important aspect of automated video surveillance. It is a precursor to many applications such as video based face recognition, tag and track of faces, association, mining, and multi-camera indexing. Face tracking in a video has been a long studied problem using many features, such as skin color and edge based face structure features. Tracking faces poses unique set of problems when compared with tracking other objects, such as people, cars, or other objects of interest.

Faces are approximately uniform in their color which makes the tracking solution possible using color as an appearance model. Many researchers have used features derived from the skin color of the face, such as color histogram, for face tracking. Using the face color as an appearance model for tracking provides invariance to different head pose variations. However, the problem of face tracking using color is challenging when the background is of similar color or in the presence of ambient illumination variations. Using edge information of faces as an appearance model for face tracking proved robust to illumination variations. However, the out-of-plane variations of the face pose worsens 2D edge model matching. A generalized tracking algorithm has also been used that models the appearance using a mixture of Gaussians. It may be used for tracking a face with pose changes, typically in-plane pose changes. Others may use an appearance model and embed the tracking in the particle filter framework.

Two main approaches have been used to track faces in videos. In one approach, local features of the face are detected (or manually marked) and the features are tracked over time. This is useful if the orientation of the face needs to be computed along with the face position (as used in Human Computer Interaction applications). Another approach utilizes global features of the face, such as a color histogram, that distinguishes the face from the background.

In surveillance videos, multiple faces need to be tracked with face sizes as small as 24×24 pixels, making it difficult to identify and track local features. The faces can undergo illumination changes (because of shadows and indoor lighting), can have partial occlusions, incomplete detections, and have large pose changes. The background may also be cluttered, depending on the setup.

BRIEF DESCRIPTION OF THE DRAWINGS

FIGS. 2A, 2B and 2C illustrate the output of the filters of FIGS. 1A and 1B for a face according to an example embodiment.

FIG. 3 is a pseudo code representation of face detection and tracking according to an example embodiment.

FIG. 7 is a series of frames from a surveillance video illustrating face tracking under varying illumination between the frames according to an example embodiment.

FIG. 14 is a series of frames illustrating back tracking to identify faces in previous frames according to an example embodiment.

DETAILED DESCRIPTION

Figure 1A:
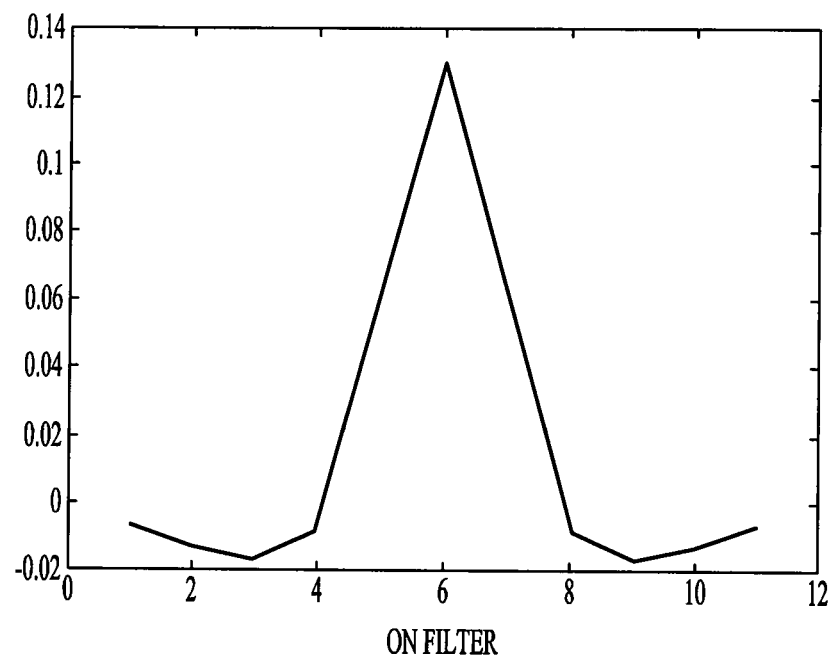
FIGS. 1A and 1B are graphs illustrating difference of Gaussian (DOG) filter models according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software, hardware and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A system and method are provided for tracking a face moving through multiple frames of a video. A predicted position of a face in a video frame is obtained. Localized search for both a color model and an edge model are performed to derive similarity values, represented as correlation values, for each position in the search area defined around the predicted position. The correlation values are then combined to determine a best position match to track a face in the video.

In the description, multiple independent appearance models used for face representation are first described, followed by a method of predicting the position of a face. A JPDAF (joint probabilistic data association filter) is used to associate faces and to select a best model hypothesis for a track of images. Methods of combining the results of the models to track the face are also described.

In one embodiment, representations from an edge representation and a color representation for a face appearance model are combined to track faces. The color representation in one embodiment is a YCbCr color space of an input image. The edge representation in one embodiment is the output of a Difference of Gaussian (DOG) filter on a grayscale input image. The two models are independent in one embodiment, and may be used to represent the appearance of a face, and track it over multiple frames of a video. In one embodiment, each model provides correlation values that may be combined by multiplication to provide a final correlation matrix which may be used for tracking.

Sequence of images or video frames (video file, online stream) may be received by a face detection and tracking system. The images in the sequence are in a bitmap format in one embodiment, but any arbitrary format can be easily converted into this format. There is no special requirement regarding frame rate for the system as in one embodiment, as it operates on individual frames. Some parameters used for tracking may be tuned based on the frame rate. The default set of parameters operate well at 8-25 fps.

Figure 1B:
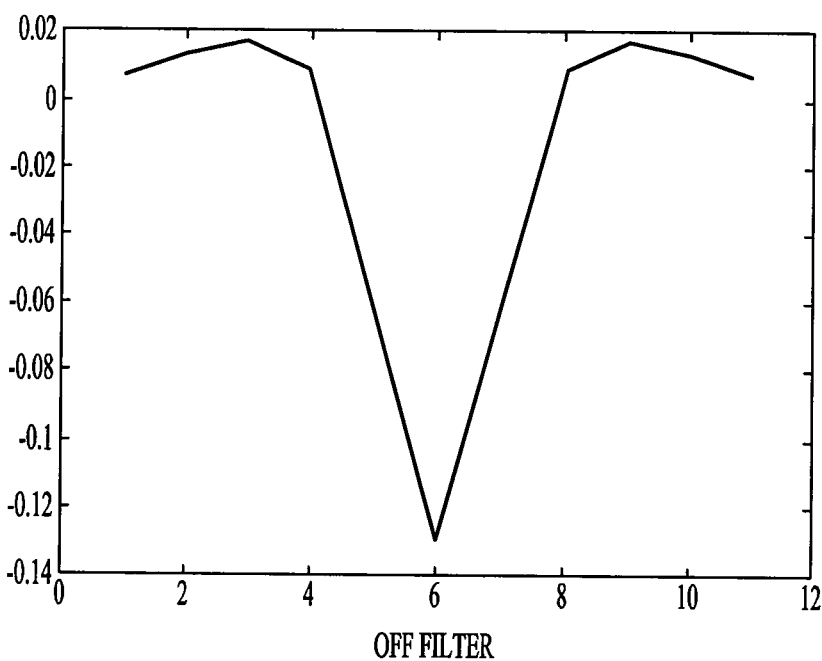

DOG filters as illustrated in FIGS. 1A and 1B. FIG. 1A illustrates a response of an on-center, off surround filter, and FIG. 1B illustrates the response of an off-center, on surround filter. A DOG filter has a response that is high around the edges of the image, i.e., where there are variations in intensity, and low (or zero) over uniform regions. In one embodiment, the DOG filter may be referred to as an edge based model or face sketch. Even though responsive to edges, DOG filters are un-oriented filters and hence are not sensitive to orientation. Cells with such properties have been found in the Lateral Geniculate Nucleus (LGN) layer of the human visual system, which is the first stage of visual processing. Such filters have contrast normalization properties which help in dealing with illumination changes. DOG filters have also been shown to be useful for face recognition. DOG filters provide good recognition rate and may be resistant to slight pose changes.

For the edge based models, the output of Difference of Gaussians (DOG) on the grayscale face image is used. There are two types of filters, on-center off-surround and off center, on-surround. Though, the output of one filter may be sufficient to obtain the output of another (basically the output of off-center is the negative of the on-center output), two filters may be used so that the representation of the appearance model is positive. On-center-off-surround filters respond when there are stimuli in the center whereas off-center-on-surround filters respond when there are stimuli in the surround. In particular, the eye regions are darker than the rest of the face and hence in those regions the off-center-on-surround filter respond more than the on-center-off-surround filter. The response of the off-center-off-surround filters is similar to the response of on-center-on-surround filters except sign change. Even though they are similar, both filters may be used because the separate representation of positive and negative part is more effective than being represented by a single number. The filters are defined as:

$$ON(x, y) = \frac{1}{2\pi\sigma_c^2}e^{-\frac{(x^2+y^2)}{2\sigma_c^2}} - \frac{1}{\sqrt{2\pi\sigma_s}}e^{-\frac{(x^2+y^2)}{2\sigma_s^2}} \quad (1)$$

$$OFF(x, y) = \frac{1}{\sqrt{2\pi\sigma_s}}e^{-\frac{(x^2+y^2)}{2\sigma_s^2}} - \frac{1}{\sqrt{2\pi\sigma_c}}e^{-\frac{(x^2+y^2)}{2\sigma_c^2}} \quad (2)$$

where, $\sigma_c$ is the standard deviation for the center Gaussian and $\sigma_s$ is for the surround Gaussian. In one embodiment, $\sigma_c=3$ and $\sigma_s=1.6*\sigma_c$. $\sigma_s=K\,\sigma_c$ is used for the surround Gaussian, where K is a constant. The filters may be normalized such that the sum of the positive values equals 1 and the sum of negative values equals 1. This results in zero response for uniform regions. Using the center surround filters results in two set of features:

$$ONOUT=ON*I \quad (3)$$

$$OFFOUT=OFF*I \quad (4)$$

where I is the input image and * is the convolution operator. ONOUT and OFFOUT represent the output of the corresponding filter. This representation is used in one embodiment as the appearance model. In one embodiment, a set of difference of Gaussians models may be obtained by varying the filter parameter $\sigma_c$ or the variance to obtain a family of edge models.

FIGS. 2A, 2B and 2C illustrate the output of the DOG filter. FIG. 2A is the input image. FIG. 2B is the ON filter output and FIG. 2C is the OFF filter output.

Color template appearance models are basically snapshots of the objects in an appropriate color space. In one embodiment, the YCbCr color space is used for representing the face. YCbCr color space may be more discriminative than other color spaces between skin and non-skin pixels. The YCbCr space may be created by converting RGB space to YCbCr space using various conversion functions. Representing the face in such a space may provide maximal separation between face and non-face pixels and hence help to track the face better. In one embodiment, illumination and pose changes are handled by combining results from the DOG and color template appearance models. Using both models and combining them facilitates tracking faces reliably in surveillance videos under head pose and ambient light illumination variations.

An overall computer implemented method 300 for tracking faces is illustrated in a pseudo code in FIG. 3. The face tracking method 300 uses detections from a face detector and tracks the face over time. An input for method 300 is a set of detections from each model for a particular frame of video. The face detection part consists of the following:
1. Conversion of the frame into required format
2. Computation of structures for fast processing (integral image)
3. Scan (optionally adaptive) across image at various scales—for each scan window the following operations are performed:
    1. Processing by an "all-pose" face detector
    2. Processing by 5-out of plane pose detector
4. Post-processing of resulting detections:
    1. Non-maximum suppression and false alarm reduction using a grouping technique.
    2. Further false alarm reduction using 5-pose SVM classifier The face tracking part consist of the following:
1. Associations of detections with the existing tracks, using the JPDAF mechanism
2. For the remaining tracks
    1. Obtain prediction from the particle filter
    2. Search around the predicted point to find the best match using the appearance models
    3. Update the best match position as the position of the track in the current frame
3. For any remaining detections
    1. Start a new track for the detection 2. Construct the prediction and appearance model for the track As shown in the pseudocode representation 300, for each track of video, as indicated at 305, a predicted position of the face is obtained at 310. If the predicted position is out of frame, the track may be deleted at 315. At 320, the best match around the predicted position is found.

At 325, detections with the tracks are associated based on an overlap between the position of the best match and the position of the detection. If more than one track is associated with a detection at 330, associations other than the one that has the best overlap are removed. In a further embodiment, association is performed by the use of a JPDAF framework as described further below.

At 335, for each detection that is not associated with a track, a new track is started on the detection. If a track is not associated with detections and the track has lived for less than two frames, it may be deleted at 340.

A particle filter in one embodiment is used to provide the prediction of the position of the track over time. Other filters may be used in further embodiments. Four states of a face may be tracked in one embodiment. They are top-left position (x,y) and velocity (vx,vy). A weight for each particle is also maintained. For each track, the following variables are maintained:

1. $p_i^x(t)$—top-left x position of the particle i at time t
2. $p_i^y(t)$—top-left y position of the particle i at time t
3. $p_i^{xv}(t)$—velocity in x direction of the particle i at time t
4. $p_i^{yv}(t)$—velocity in $y$ direction of the particle i at time t
5. $wt_i(t)$—weight for particle i at time t When a face is detected by the detector, a new track is created and the corresponding particles are initialized. Each track is initialized with a set of 1000 particles with an initial constant velocity of 1 and the position of the particles distributed around the top-left position of the detected face. In one embodiment, 1000 particles are provided with an initial position around the top-left corner of the detected face, and the initial weight set to a constant $$p_i^x(1) = obs^x + \sigma * G(i)$$
$$p_i^y(1) = obs^y + \sigma * G(i)$$
$$p_i^{xv}(1) = X_{VEL} + \sigma * G(i)$$
$$p_i^{yv}(1) = Y_{VEL} + \sigma * G(i)$$
$$wt_i = \frac{1}{N}$$

where $obs^x(t)$, $obs^y(t)$ is the observed (x,y) position (from the face detector) of the track at time $t$, $X_{VEL}$, $Y_{VEL}$ is the initial velocity, G(i) is a Gaussian random number, σ (sigma) is the variance, and N is the number of particles. The particles would be distributed around the detected position depending on σ. σ is set to 2 in one embodiment of the tracker.

For any time, t, the prediction of the position from the particle filter is obtained as follows:

$$\hat{x} = \frac{1}{N}\sum_i p_i^x$$

$$\hat{y} = \frac{1}{N}\sum_i p_i^y$$

Figure 4:
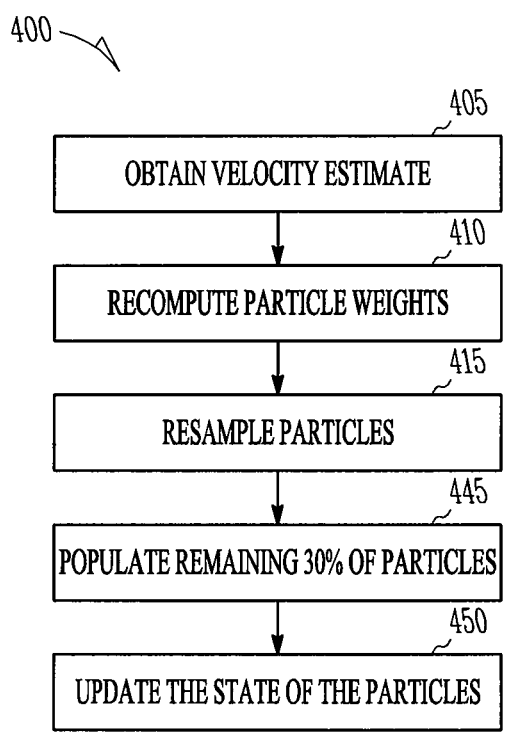
FIG. 4 is a flowchart with pseudo code illustrating a method of updating a particle filter according to an example embodiment.

The particle filter is also updated at various times as illustrated at 400 in FIG. 4. Let the observed position (either from detection or the obtained by search) be $obs^x(t)$, $obs^y(t)$. The velocity estimate may be obtained at 405 by $obs_v^x(t) = obs^x(t) - obs^x(t-1)$ and $obs_v^y(t) = obs^y(t) - obs^y(t-1)$ The following steps are used to update the particle filter: Recompute the weights of the particles at 410 based on the observation:

$$wt_i = \exp\left(-0.5 * \left(\frac{(p_i^x - obs^x)^2 + (p_i^y - obs^y)^2}{\sigma_d} + \frac{(p_i^{xv} - obs^{xv})^2 + (p_i^{yv} - obs^{xv})^2}{\sigma_{dv}}\right)\right)$$

where $\sigma_d$ and $\sigma_{dv}$ are for position and velocity respectively. This determines the distribution of the weight values across the particles.

The particles are resampled at 415 based on the weights. Around (50+P)% of the new particles are generated by resampling the original set of particles based on their weights, where P ranges from 0 to 50. A sampling with replacement algorithm may be used to resample the particles.

The remaining (50−P)% of the particles may be populated using the observation at 445. These particles would have their states distributed around the observation, just like in the initialization. The state of the particles is then updated at 450. In one embodiment, the state of the particles are updated using:

$$p_i^x(t+1) = p_i^x(t) + p_i^{xv}(t) + \sigma * G(i)$$
$$p_i^y(t+1) = p_i^y(t) + p_i^{yv}(t) + \sigma * G(i)$$
$$p_i^{xv}(t+1) = p_i^{xv}(t) + \sigma * G(i)$$
$$p_i^{yv}(t+1) = p_i^{yv}(t) + \sigma * G(i)$$
$$wt_i = \frac{1}{N}$$

where σ is a constant.

Figure 5:
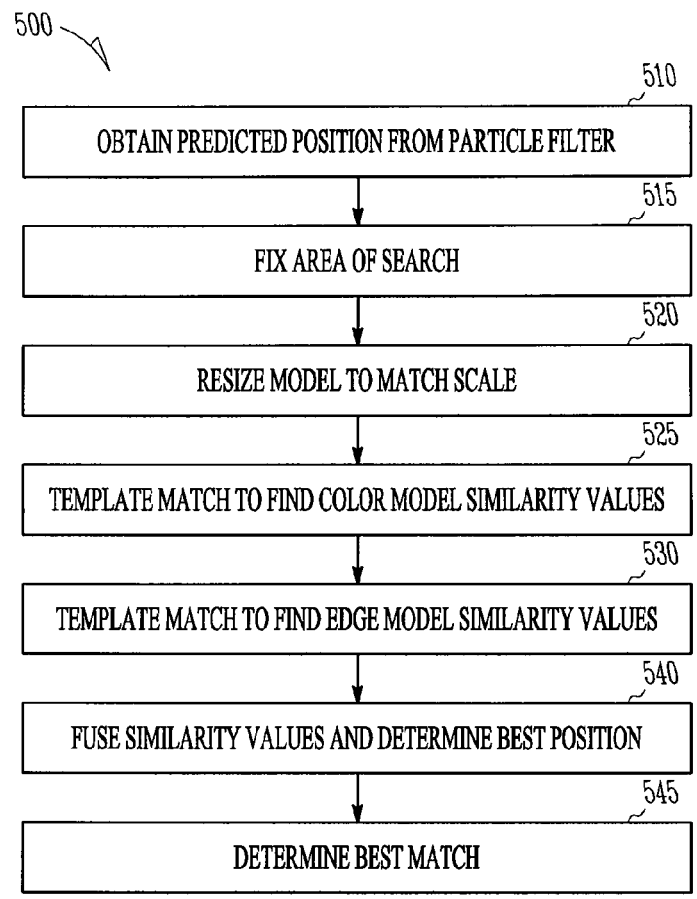
FIG. 5 is a flowchart representation of a method of tracking a face using multiple models according to an example embodiment.

A search may be performed to find the best match as illustrated in FIG. 5 at 500. In order to find the location of the track in the current frame, a search using the appearance model around the predicted position is done in one embodiment to find the best match which is then used to update the appearance model.

In one embodiment, appearance models based on multi-scale features may be built. The scale of the appearance model may then be chosen based on the scale of the face as detected by the face detector. For a single face, multiple appearance models of varying scale may be maintained and updated accordingly. In further embodiments, the appearance model may also be based on the pose of the face. If the pose information changes, then the appearance model is updated faster, whereas if the same pose information is maintained, then it is updated slower.

Particle filters may be used to capture the motion information and predict the position of the tracked face over time. Particle filters may be more effective than Kalman filters due to their handling of non-linearity and non-Gaussian properties of the track. Particle filters are defined by state equation and the observation model. The state transition equations are defined as:

$$\sigma_t = F(\sigma_{t-1}, U_t) \quad (5)$$

where $\sigma_t$ represents the state of the filter at time t, F(.) is the state transition function, and $U_t$ is the system noise. The observation model is defined as:

$$Y_t = G(\sigma_t, V_t) \quad (6)$$

where $Y_t$ defines the observation given the state $\sigma_t$, G(.) is the observation model function, and $V_t$ is the process noise. The particle filter approximates the posterior distribution by a weighted set of particles. The estimate of the predicted value can be obtained by a minimum mean square error estimate:

$$\hat{\theta}_t = \sum_{i=1}^{N} W_t^i \theta_t^i \quad (7)$$

At 510, the predicted position is obtained from the particle filter (x,y). The position (x,y) and the velocity ($v^x, v^y$) of the face are modeled. These form the state variables. The state transition is represented as a fixed constant-velocity model where $\gamma_t$ is a random Gaussian noise. In one embodiment, 1000 particles are used to model the distribution. The estimate of the variables is given by:

$$x_{t+1} = x_t + v_t^x + \gamma_t$$
$$y_{t+1} = y_t + v_t^y + \gamma_t$$
$$v_{t+1}^x = v_t^x + \gamma_t$$
$$v_{t+1}^y = v_t^y + \gamma_t$$

$$X_t = \frac{1}{N} \sum_i x_t^i W_t^i \quad (8)$$

$$Y_t = \frac{1}{N} \sum_i y_t^i W_t^i \quad (9)$$

where $(X_t, Y_t)$ is the prediction of the position at time t, $w_t^1$ is the weight associated with the particle, and $\gamma_t$ is Gaussian random noise as defined before. The weight of each particle is estimated based on the following equation:

$$w_{t+1}^j = \exp\left(\frac{D(t)}{2} + \frac{V(t)}{2}\right) \quad (10)$$

$$D(t) = \frac{(X_t - OX_t)^2 + (Y_t - OY_t)^2}{\sigma_{xy}^2} \quad (11)$$

$$V(t) = \frac{(v_t^x - (OX_t - OX_{t-1}))^2 + (v_t^y - (OY_t - OY_{t-1}))^2}{\sigma_v^2} \quad (12)$$

where $w^i_t$ is the weight of particle i at time t, $(OX_t, OY_t)$ is the observation (the best estimate based on search) of position at time t, $\sigma_x y = 10$ and $\sigma_v = 20$. After each iteration, the best particles are chosen for the next iteration. This is done by resampling strategy. A select with replacement algorithm is used for resampling in one embodiment. This ensures that the particles represent the position of the track consistently. Along with this the observation may be used to replace the particles with least weight. The current observation is used to seed the states of the particles.

The particle filter algorithm used in one embodiment of the face detecting and tracking system is as follows:
   Initialize the particle filter with 1000 particles. The states of the particle are initialized using the first observation. This is obtained from the face detector
   Propagate the state of the particles using equation (10)
   Resample 70% of the particles using select with replacement algorithm. This will ensure that the particles with high weight are selected for the next iteration
   Replace the remaining 30% of the particles with the current observation
   Predict the next location using equations 8 and 9.

At 510, the predicted position is obtained from the particle filter (x,y). At 515, the area of search is fixed to be ($x_1, y_1, x_2, y_2$) where, $x_1 = x - \text{appModelWidth}$ $y_1 = y - \text{appModelWidth}$ $x_2 = x + \text{appModelHeight}$ $y_2 = y + \text{appModelHeight}$ That is, the area of search is twice the size of the appearance model.

For scale=0.95, 1, 1.05, the appearance model may be resized at 525 to match the scale. At 525, [^C]=correlation values may be obtained by template matching within the search area for color template appearance model. [^D]=correlation values may be obtained at 530 by template matching within the search area for DOG appearance model. The correlation values are then multiplied at 540, [^F]=[^C]*[^D] where [^F] is the final correlation value matrix. Also at 540, the best position for scale s is $(x_b^s, y_b^s) = \text{argmax}_{x,y}(F)$ with correlation value $V_s$. Out of three positions, the best one is chosen at 545 based on the maximum correlation value:

$$(x_b, y_b) = \text{argmax}_s V_s$$

Figure 6:
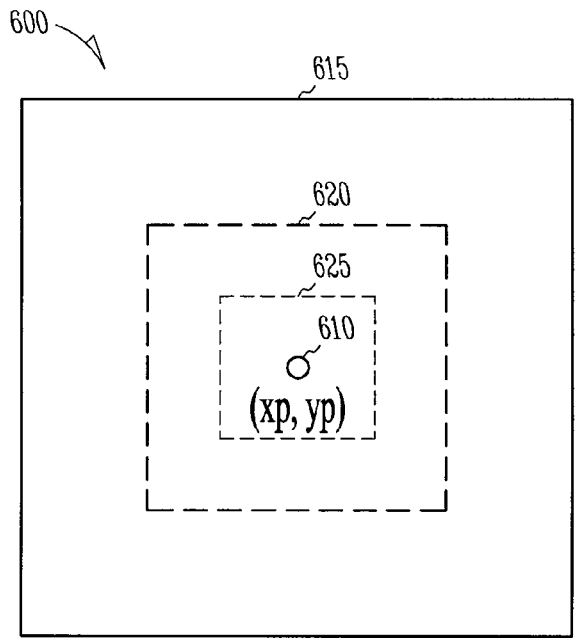
FIG. 6 is a block representation of a predicted position according to an example embodiment.

FIG. 6 is a graphical representation of the search for the best match at 600. x,y at 610 indicates the predicted position. Solid line 615 indicates the frame, dashed line 620 indicates the search area and dotted line 625 indicates the size of the appearance model.

The correlation values obtained by search using the two appearance models are multiplied to obtain the final correlation matrix as indicated above at 540. The final correlation matrix is then used to find the best match position at 545. Multiplication ensures that the final best position is the one that has high correlation value for both the appearance models. One interesting aspect of this approach is that the range of the correlation values is different for each appearance model. For example, the range for color template appearance model in one embodiment is from 0.96 to 1 while the range for DOG appearance model is from 0.3 to 1. Because of the difference in range the final position estimate may be influenced heavily by the DOG appearance model. In one embodiment, the correlation values are normalized prior to multiplication. In further embodiments, the correlation values are weighted such that correlation values of models that match detected video conditions are more heavily weighted.

The predicted position from the particle filter gives an approximate location of the track. The dimension of the face (width, height) is obtained from the appearance model. When the face is detected, the width and height provided by the face detector may be used to construct the appearance model. After that, the face is searched across scale space to determine the appropriate width and height. From the predicted position, a search area is constructed If the tracker loses a face then it may be difficult for the tracker to reacquire the face since the estimated position heavily influences the predicted position (since the latest observation is incorporated into the framework). Thus the particle filter framework in one embodiment, maintains multiple distributions of particles. In one embodiment, a boosted particle filter uses AdaBoost (adaptive boost—modifying a classifier in favor of instances misclassified by previous classifiers) detections to form part of the proposal distribution. In particular, based on a parameter, some particles may be sampled from proposal distributions based on AdaBoost detections and some are sampled based on state estimates. This helps the tracker to rely both on state estimates and AdaBoost detections, thus complementing each other. Even though some particles are distributed based on the wrong estimate, some others are still distributed based on the detection (which is assumed correct) and hence the tracker would be able to reacquire the track.

FIG. 7 show several frames which illustrate the handling of illumination changes. The illumination changes drastically between Frame 15 and Frame 17, from light to dark. A color template appearance model used alone would lose tracking with such an illumination change. However, the combined models of color template plus DOG appearance model performs better. The person is tagged and tracked over Frames 5 to 18. As the light changes, the track is still maintained.

JPDAF may be used for both associations and selection of a best hypothesis. When there are multiple detections in a frame, the detections may be associated with the appropriate tracks using the JPDAF mechanism. Multiple hypothesis (for the position of the track) may be generated for a track, and the best hypothesis may be selected based on the joint probability of motion and appearance, also using JPDAF. Joint Probability based data association framework (JPDAF) is a data association framework which computes the best association for a track based on the joint probability (on motion and appearance).

Figure 8:
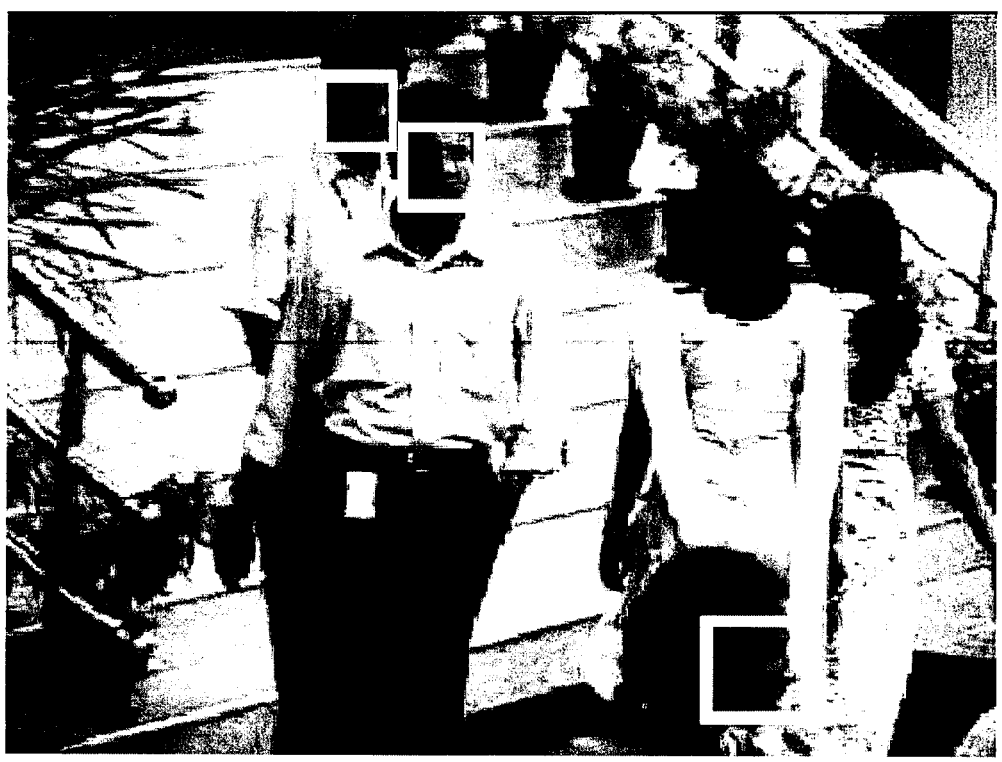
FIG. 8 is an illustration of simultaneous tracks in a scene, and the association of faces with tracks according to an example embodiment.

In a typical scenario, there are many simultaneous tracks present in the scene, since there is a track associated with each detected face in the scene. The input to the tracker is the output of the face detector along with the input image. The output of the face detector typically contains multiple detections for a single frame. The problem is the association of the detections with the corresponding tracks. For example, FIG. 8 shows an output of the detector that contains three detections (indicated by a square around each face), two of which are very close to each other. Since there are three tracks (one for each person) in the scene, the problem is to associate the two tracks of the faces that are very close to each other with their corresponding detections.

There are many methods that may achieve this task such as a nearest neighbor association. In a nearest neighbor association, the detection that is closest to the predicted position of the track is associated with the track. The main problem with this method is that if there are two faces (hence tracks) nearby, and if only one of them has a detection, then the track might get associated with the wrong detection.

Figure 9:
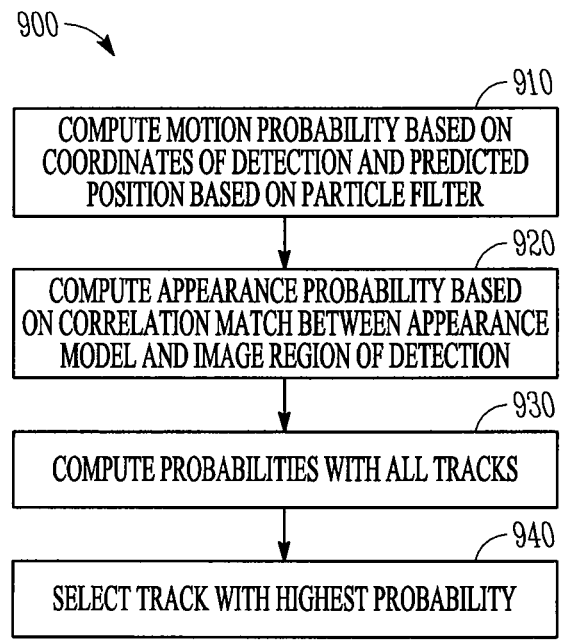
FIG. 9 is a flowchart illustrating selection of a track for a detected face according to an example embodiment.

In one embodiment as illustrated at 900 in the flowchart of FIG. 9, two probabilities are considered to associate detection with the track. They are motion probability and appearance probability. The motion probability represents how close the detection is to the predicted position and the appearance probability represents how close the detection appearance matches with the appearance model of the track. The association is determined based on these probabilities.

In one embodiment, the JPDAF framework is used for data association. The motion probability is computed as described above at 910. The coordinates of the detection and the predicted position based on the particle filter is used to compute the motion probability. The appearance probability is calculated at 920 based on the correlation match between the appearance model and the image region of the detection. In one embodiment, to associate detection with the track, the motion and appearance probabilities are computed for the detection with all the tracks at 930. Then, the track with the highest probability is chosen as the associated track for the detection at 940.

Figure 10:
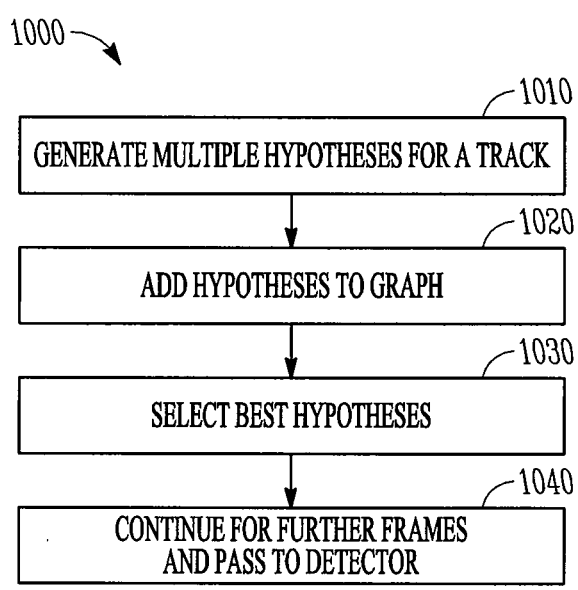
FIG. 10 is a flowchart illustrating selection of a best hypothesis according to an example embodiment.
Figure 11:
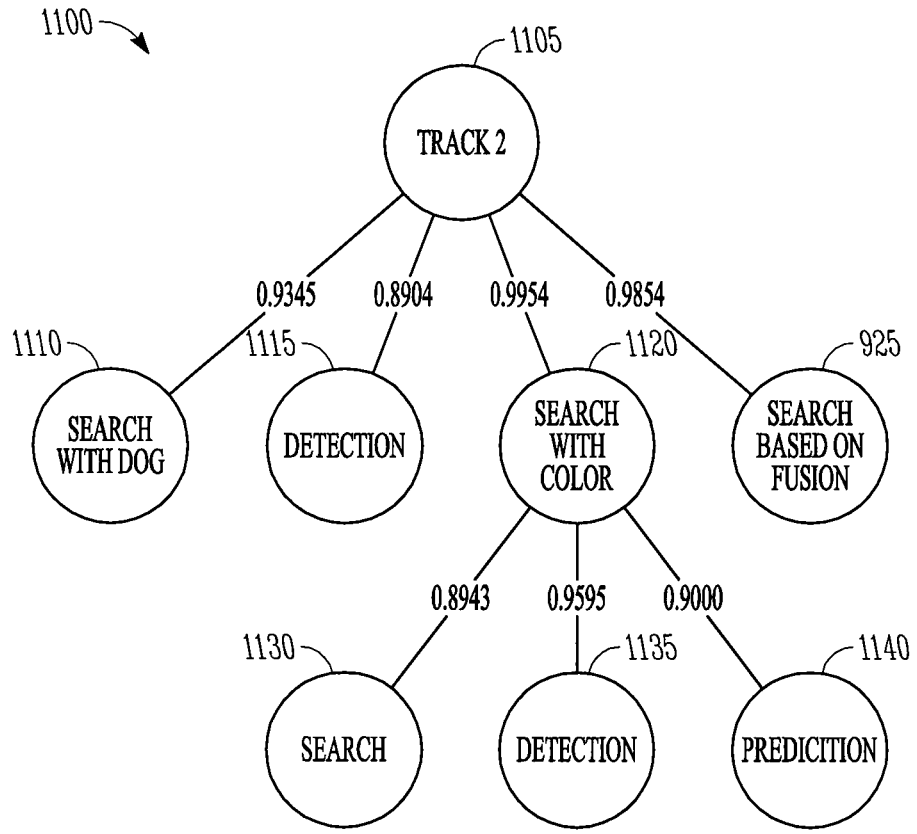
FIG. 11 is a graph illustrating selection of a best hypothesis according to an example embodiment.

JPDAF is also used for selecting the best hypothesis for a track as illustrated at 1000 in FIG. 10. For a track, multiple hypotheses are generated if the detection does not match well with the track or if there are no detections associated with the track. In this case, search based on the appearance model is used to generate additional hypothesis. Multiple hypotheses that are added are:

Hypothesis based on search by color template model
Hypothesis based on search by DOG model
Hypothesis based on the fusion of color template and DOG model
Hypothesis based on the prediction from particle filter These four hypotheses at 1020 are added to a graph 1100 for each track as illustrated in FIG. 11. If there are overlaps in the predicted positions of the hypothesis then only one node is added to the graph. For example, a track 2 at 905 has four hypothesis added to the graph based on (1) search with DOG appearance model 1110, (2) Detection from the face detector 1115, (3) search based on color template appearance model 1120 and (4) the hypothesis based on the fused result of DOG and color template 1125. Probabilities are indicated on the edges of the graph between nodes. Out of these four, the best hypothesis is selected at 1030. It is the one returned by search based on color template 1120. This is computed based on the motion and appearance probability of the track with the hypothesis.

In the next frame as indicated at 1040 the process continues. The same track has three hypotheses, (1) search 1130—since the three search results (color, DOG and fused) returned similar hypothesis, they are fused into one hypothesis, (2) detection 1135 and (3) prediction 1140 from the particle filter. This time, the detection hypothesis 1135 is selected as the best one based on the motion and appearance probability.

Figure 12:
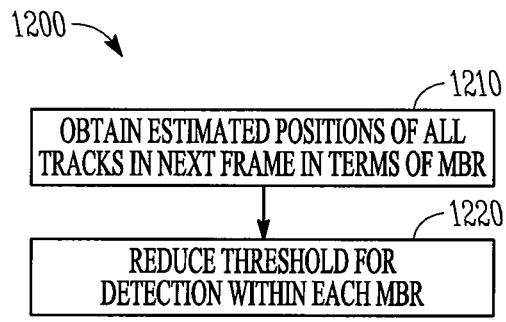
FIG. 12 is a flowchart illustrating reduction of a detection threshold in a predicted area for a face according to an example embodiment.
Figure 13:
FIG. 13 illustrates detection of faces without and with feedback according to an example embodiment.

Once the tracks are established, the predicted position of the track in the next frame is passed on to the detector at 1040. This information is used by the detector to improve the detections as shown at 1200 in FIG. 12. The tracker obtains estimated positions of all the tracks for the next frame in terms of the MBRs (minimum bounding rectangle) of the face at 1210. The detector then reduces the threshold to a lower threshold value for detection at 1220 when the search regions fall within the MBRs. The set values of the detector threshold may be predefined based on acceptable false alarm. By lowering the threshold, the detection rate in the MBR region is enhanced. The MBR region covers typically a single face and multiple detections, if any, in that region can be grouped together to form a single detection. If multiple detections are present, then the JPDAF association algorithm will take care of associating the detections with the corresponding tracks. The use of a variable threshold based on tracking feedback leads to improved detection (and tracking) of the module as shown in two frames illustrated in FIG. 13, where the first frame illustrates detection without feedback, wherein on the face in the foreground was detected, and the second frame represents detection with feedback, where both faces were detected. Generally a low threshold would lead to false hits, and a high threshold leads to loss of the face in the track. By dynamically adjusting the threshold for a region where the face is expected, false hits and loss of the face may be minimized.

In a typical surveillance video, the face may not be detected when it first appears in the scene. This may be due to the quality of the face image such as the size of the face (smaller than the minimum size that can be detected) or the illumination conditions. Hence, the face may be detected only after some frames in the scene. In order to establish the fall track of the face, the tracker traces back the face starting from the frame where it was detected and going backwards in time up to the point where it can be reliably tracked. With backtracking capability, even though the track is traced only after the face has moved past the frames, the information is used later for better description of where the person was.

The system of backtracking can also be used to merge two tracks offline. If the backtracked position of the track overlaps with another track's forward position both in space and time for a number of frames, then we can assume that the tracks are similar and merge them together In a typical video, the track matching process may lead to a track drift. In such a case, the tracks will lie on the background and are typically deleted after a few frames. The problem with this method is that the numbers of frames a track can linger is predefined and thereby lead to track splits. Instead, the track is hidden for a number of frames and shown later only if it gets associated with a detection within a specified time. If it gets associated with a detection, then the hidden part of the track is retraced and stored along with the track information. Otherwise the track is deleted.

An example with a realistic surveillance video with multiple people walking and complex backgrounds is illustrated in several frames of a video in FIG. 14. Initially, faces in the video are tagged (detected) by means of the face detector, and then the tagged faces are tracked. The output of the tracker is shown for several frames in FIG. 14. Two faces are tracked in the sequence of video images. The faces are identified with squares drawn around them. Other attributes may be used to identify the faces, such as highlighting. A person in a dark shirt in Frame 13 is so indicated, along with a person immediately to the left of him in Frame 20. As seen in subsequent frames, the tracker was able to track both people consistently despite various pose changes, including rapid changes over time as they reached the bottom of the stairs and turned, as the person in the dark shirt turned his head in Frame 100. Note that the scale also changed as they walked toward the camera.

Figure 15:
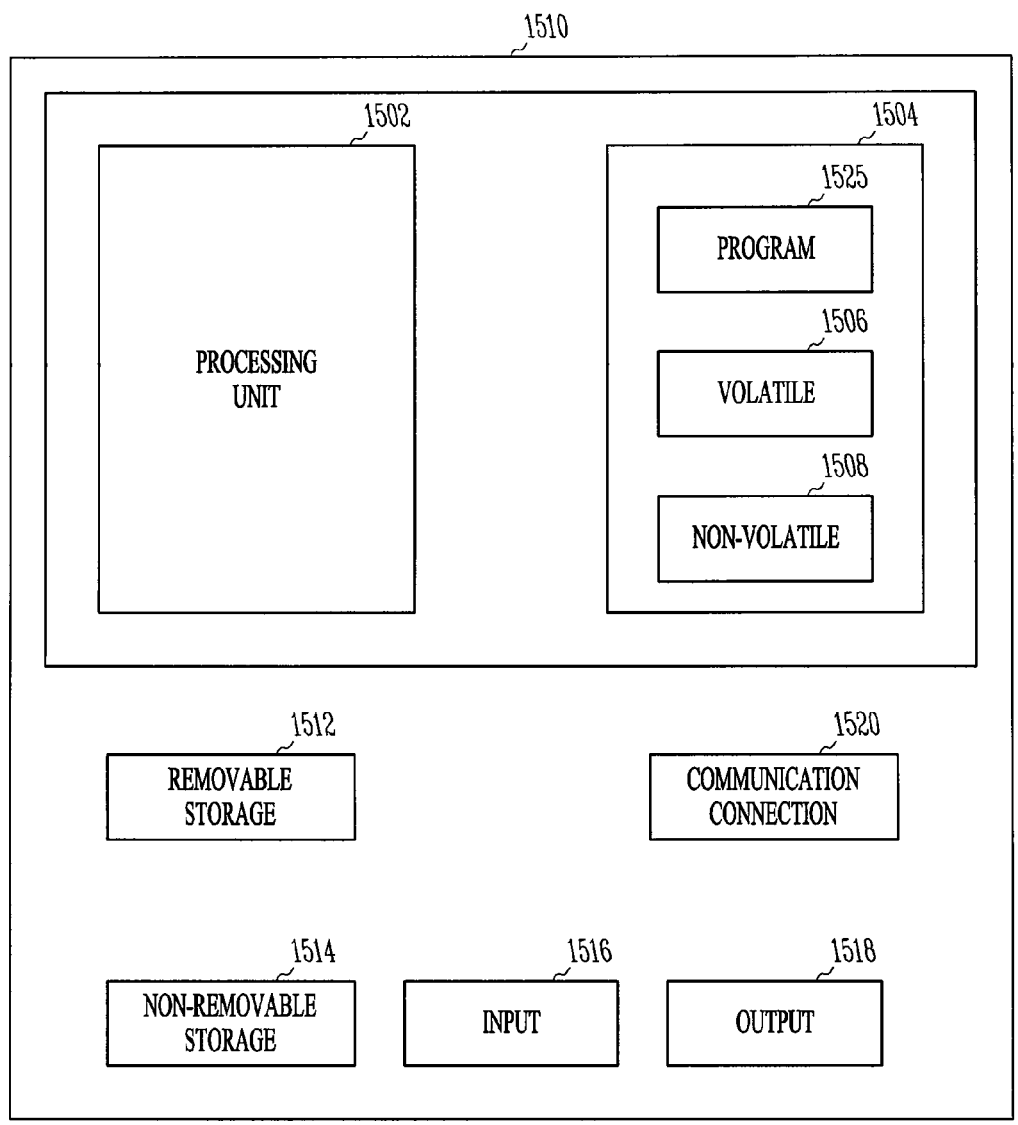
FIG. 15 is a block diagram of a typical computer system used to implement methods according to an example embodiment.

A block diagram of a computer system that executes programming, including tracker and detector modules, for performing the above algorithms and methods is shown in FIG. 15. A general computing device in the form of a computer 1510, may include a processing unit 1502, memory 1504, removable storage 1512, and non-removable storage 1514. Memory 1504 may include volatile memory 1506 and non-volatile memory 1508. Computer 1510 may include—or have access to a computing environment that includes—a variety of computer-readable media, such as volatile memory 1506 and non-volatile memory 1508, removable storage 1512 and non-removable storage 1514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions, as well as data, including video frames. Computer 1510 may include or have access to a computing environment that includes input 1516, output 1518, and a communication connection 1520. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 1502 of the computer 1510. A hard drive, CD-ROM, and RAM are some examples of articles including a computer-readable medium.

A robust face tracking system tracks faces under varying illumination and head pose changes is presented. The system may handle illumination changes by means of combining multiple appearance models. It can also handle both in-plane and out-of-plane pose changes reliably. DOG filters are used to generate appearance models for the face. The appearance models are combined with a color appearance model to obtain robust tracking of a face through illumination, pose and scale changes. A JPDAF framework is used to associate detected faces to tracks and to select a best hypothesis from multiple appearance models. Multi-scale features may be used to effectively track faces that may vary significantly in size between different frames. Detection thresholds are also varied within a rectangle where the face is expected based on feedback to optimize detection. Still further, multiple appearance models may be updated based on different poses of the faces.

The Abstract is provided to comply with 37 C.F.R. §1.72(b) with the understanding that it will not be used to interpret or limit the scope or meaning of the claims.

The invention claimed is:

1. A computer implemented method of tracking a face moving through multiple frames of a video sequence, the method comprising:
   obtaining a predicted position of a face in a video frame;
   performing a search to determine appearance model similarity values of detected face;
   obtaining motion and appearance probabilities of the detected face; and
   associating the face in the video frame with a track as a function of a joint probabilistic data association filter using a detection threshold that is reduced for a face appearing in the predicted position.

2. The method of claim 1 wherein a particle filter is used to obtain the predicted position of the face in a video frame.

3. The method of claim 1 wherein the appearance model includes an edge model comprising a set of difference of Gaussians (DOG) models, or comprising a set of Laplacian of Gaussians (LOG) models.

4. The method of claim 3 wherein the set of difference of Gaussians models is obtained by varying the filter parameter sigma or the variance.

5. The method of claim 3 wherein the DOG or LOG models comprise a DOG or LOG filters that has a high response around edges of an image.

6. The method of claim 1 wherein the face is scaled for the color model as the face moves through frames of video.

7. The method of claim 1 and further comprising tracking the face backwards, starting from the frame where the face was detected, until the face moves out of the frame, so as to construct a full track of the face.

8. The method of claim 1 and further comprising tracking the face backward until 2 tracks can be merged.

9. The method of claim 1 wherein the joint probabilistic data association filter generates multiple hypotheses for the track, the hypotheses comprising:
   a hypothesis based on search by color template model;
   a hypothesis based on search by DOG model;
   a hypothesis based on a fusion of color template and DOG model;
   a hypothesis based on prediction from a particle filter; and
   wherein a best hypothesis is selected for the track.

10. The method of claim 1 and further comprising:
   generating multiple hypotheses for a track and identifying a best hypothesis for a track to provide to the means for associating a face in the video frame.

11. The tracker of claim 10 wherein the means for generating multiple hypotheses does so as a function of a joint probabilistic data association filter.

12. A computer readable storage device having instructions for execution on a computer to perform a method of tracking a face moving through multiple frames of a video, the method comprising:
   obtaining a predicted position of a face in a video frame;
   performing a search to determine appearance model similarity values of detected face;
   obtaining motion and appearance probabilities of the detected face; and
   associating the face in the video frame with a track as a function of a joint probabilistic data association filter using a detection threshold that is reduced for a face appearing in the predicted position.

13. A system for tracking faces in surveillance video frames, the system comprising:
   a position predictor that provides a predicted position of a face in a video frame;
   an appearance model that provides color and edge similarity values around the predicted position of the face; and
   means for associating a face in the video frame with a track as a function of a joint probabilistic data association filter using a detection threshold that is reduced for a face appearing in the predicted position.

14. The system of claim 13 wherein the means for associating a face in the video frame with a track combines color model similarity values with the edge model similarity values in the appearance model by multiplying the color model similarity values with the edge model values.

15. The system of claim 14 wherein the edge model comprises a difference of Gaussians (DOG) model having a DOG filter that has a high response around edges of an image.

16. The system of claim 13 wherein the joint probabilistic data association filter generates multiple hypotheses for the track, the hypotheses comprising:
   a hypothesis based on search by color template model;
   a hypothesis based on search by DOG model;
   a hypothesis based on a fusion of color template and DOG model;
   a hypothesis based on prediction from a particle filter; and
   wherein a best hypothesis is selected for the track.

17. The system of claim 13 wherein the face is scaled for the appearance model as the face moves through frames of video.

18. The system of claim 13 wherein a particle filter is used to obtain a predicted position of a face in a video frame.

19. The system of claim 13 wherein the lingering tracks are hidden for a number of frames unless the track is re-associated with a detection at a later point, wherein the hidden part of the track is retraced and stored along with track information.

20. The system of claim 13 wherein the backtracked track path is checked to see if it overlaps with any other track path and if it does the two tracks are merged.

21. The system of claim 13 and further comprising:
   means for generating multiple hypotheses for a track and identifying a best hypothesis for a track to provide to the means for associating a face in the video frame.

22. The system of claim 21 wherein the means for generating multiple hypotheses does so as a function of a joint probabilistic data association filter.

* * * * *